(No Model.)
J. O. DAVIS.
Expansion Connection for Pipes.
No. 231,479. Patented Aug. 24, 1880.
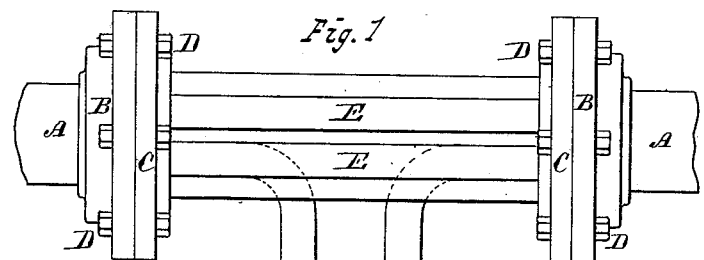
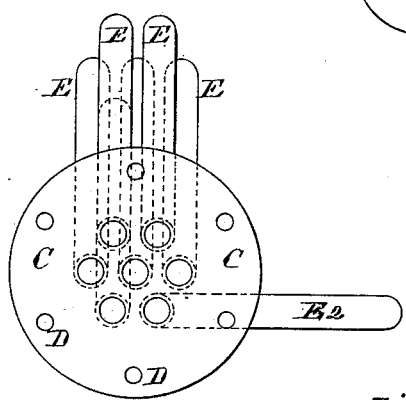
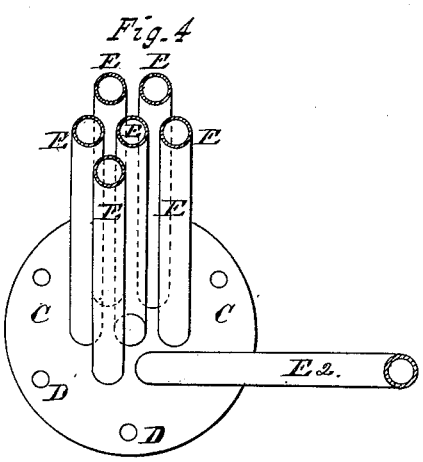
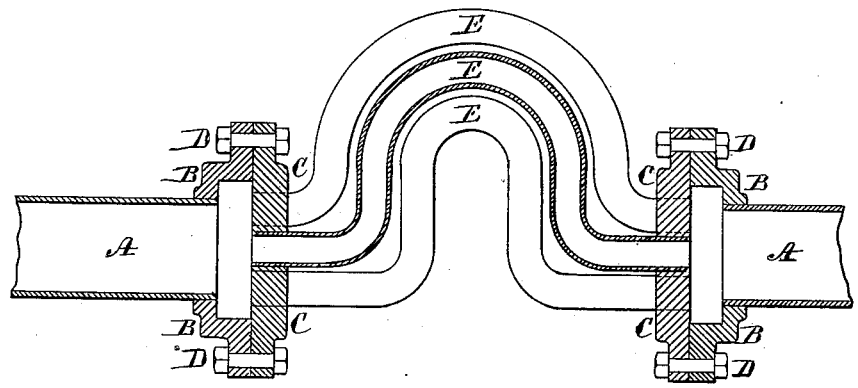
Witnesses
Inventor

UNITED STATES PATENT OFFICE.

JOHN O. DAVIS, OF HARTFORD, CONNECTICUT.

EXPANSION-CONNECTION FOR PIPES.

SPECIFICATION forming part of Letters Patent No. 231,479, dated August 24, 1880.

Application filed May 6, 1880. (No model.)

*To all whom it may concern:*

Be it known that I, JOHN O. DAVIS, of Hartford, in the county of Hartford and State of Connecticut, have invented certain new and useful Improvements in Expansion-Connections for Pipes; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

My improvement relates to connections for the ends of pipes that are subject to great expansion and contraction from variations in temperature, and more especially for those pipes which are laid underground for the purpose of conveying steam for heating purposes. Such pipes are at present laid in wooden logs bored out to receive them, and are inaccessible after being laid. The joints where the allowance has been made for expansion and contraction have been of the plunger form, which have required occasional packing, and this has proved a great inconvenience and expense.

The object of my invention is to provide a joint or connection which shall allow of expansion and contraction, and at the same time need no attention after being laid.

In the accompanying drawings, which illustrate my invention, Figure 1 shows a top or plan view of my improvement. Fig. 2 is a vertical section through the middle, showing the parts beyond. Fig. 3 is a view of the face of the tube-plate detached, showing the pipes beyond. Fig. 4 is a vertical cross-section through the middle of the connecting-tubes, showing the parts beyond.

A and A are the ends of the lines of pipes between which it is desired to introduce the expansion mechanism. These pipes, as represented in the drawings, are supposed to be wrought-iron, and screwed into the flange-heads B. If cast-iron pipes are used, the part B would be the ordinary flange of the pipe.

C and C are the tube-plates, which are bolted to the flanges B by means of the bolts D, in the ordinary manner.

E E, &c., are tubes bent into the form shown in the drawings, and extending from one of the plates C to the other. These tubes are preferably made of brass, and not to exceed one and a half inch in diameter, in order to give them the required elasticity without too great a curve.

The area of the pipes A is obtained by using a greater number of the smaller tubes, so as not to obstruct the conveying capacity of the main pipes.

The ends of the pipes E are secured into suitable sockets in the plates C by swaging outward into the sockets, or in any other usual manner of setting steam-pipes into similar plates. The metal of the pipes E being elastic, their curved form allows the ends of the main pipes A to approach or recede from each other under the varying heat of the contained steam.

$E^2$ is one of the small brass curved tubes, which is bent out horizontally. This is one of the lower tubes, lying as low as the bottom of the main pipes A, and is made in this form to carry back the condensed water or drip of the pipes, in the usual manner. The other pipes of the connection are made to bend above the horizontal line to keep them free from water and admit of the steam passing freely.

By means of my invention pipes can be laid underground that will require no further attention, and which will provide for all the expansion and contraction required from the highest to the lowest temperature to which they will be subjected.

What I claim as my invention is—

1. The combination of the tube-plates C with the bent tubes E $E^2$, to form an elastic connection for the ends of steam-pipes, substantially as described.

2. The combination of a number of small metallic tubes bent to the form described and shown, and having their ends inserted into suitable connecting-plates, with the free ends of metallic pipes of larger diameter, to form an elastic steam-tight connection, substantially as described.

3. The curved drip-pipe $E^2$, in combination with an expanding steam-connection and the pipes A, substantially as and for the purpose described.

JOHN O. DAVIS.

Witnesses:
THEO. G. ELLIS,
W. J. MYERS.